United States Patent
Morrison et al.

(10) Patent No.: US 6,601,165 B2
(45) Date of Patent: *Jul. 29, 2003

(54) APPARATUS AND METHOD FOR IMPLEMENTING FAULT RESILIENT BOOTING IN A MULTI-PROCESSOR SYSTEM BY USING A FLUSH COMMAND TO CONTROL RESETTING OF THE PROCESSORS AND ISOLATING FAILED PROCESSORS

(75) Inventors: John A. Morrison, Ft. Collins, CO (US); Michael S. Allison, Ft. Collins, CO (US); Leo J. Embry, Ft. Collins, CO (US); Stephen J. Silva, Ft. Collins, CO (US); John R. Feehrer, Loveland, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,846

(22) Filed: Mar. 26, 1999

(65) Prior Publication Data

US 2002/0133693 A1 Sep. 19, 2002

(51) Int. Cl.$^7$ ................................................ G06F 3/00
(52) U.S. Cl. ................................ 713/2; 713/1; 709/222; 710/10; 710/104
(58) Field of Search .................................. 713/1, 2, 100; 709/220, 222, 221; 714/13, 7, 31, 10, 11; 710/39, 10, 104

(56) References Cited

U.S. PATENT DOCUMENTS

| | | | | |
|---|---|---|---|---|
| 4,819,232 A | * | 4/1989 | Krings | 714/13 |
| 5,327,548 A | | 7/1994 | Hardell, Jr. et al. | 395/425 |
| 5,450,576 A | | 9/1995 | Kennedy | 395/650 |
| 5,491,788 A | * | 2/1996 | Cepulis et al. | 714/13 |
| 5,615,330 A | | 3/1997 | Taylor | 395/182.05 |
| 5,694,600 A | * | 12/1997 | Khenson et al. | 713/2 |
| 5,715,456 A | | 2/1998 | Bennett et al. | 395/652 |
| 5,724,527 A | | 3/1998 | Karnik et al. | 395/308 |
| 5,724,599 A | * | 3/1998 | Balmer et al. | 395/800 |
| 5,754,887 A | * | 5/1998 | Damron et al. | 710/39 |
| 5,790,850 A | * | 8/1998 | Natu | 713/2 |
| 5,819,087 A | * | 10/1998 | Le et al. | 713/2 |
| 5,904,733 A | * | 5/1999 | Jayakumar | 713/2 |
| 6,073,251 A | * | 6/2000 | Jewett et al. | 714/7 |
| 6,108,781 A | * | 8/2000 | Jayakumar | 713/2 |
| 6,134,071 A | * | 10/2000 | Andoh et al. | 360/75 |
| 6,191,499 B1 | * | 2/2001 | Severson et al. | 307/31 |

* cited by examiner

Primary Examiner—Jeffrey Gaffin
Assistant Examiner—Rijue Mai (57) ABSTRACT

An apparatus and method for fault resilient booting of a multi-processor system. The apparatus attempts a cold reset of the system, during which each processor performs a built-in self test. The apparatus selects a boot strap processor to perform a warm reset, during which any failed processors are tristated using a flush command. If no boot strap processor is available, the apparatus performs the warm reset and tristates any failed processor including the processor predesignated to be the boot strap processor, and then repeats the attempt to establish the boot strap processor.

16 Claims, 6 Drawing Sheets

APPARATUS AND METHOD FOR IMPLEMENTING FAULT RESILIENT BOOTING IN A MULTI-PROCESSOR SYSTEM BY USING A FLUSH COMMAND TO CONTROL RESETTING OF THE PROCESSORS AND ISOLATING FAILED PROCESSORS

FIELD OF THE INVENTION

The present invention relates to an apparatus and method for fault resilient booting in a multi-processor computer system.

BACKGROUND OF THE INVENTION

Multi-processor computer systems may experience problems when booting if one or more of the processors fails during a reset. A processor fails by not successfully executing the reset instruction and may not respond to further instructions or may provide erroneous output. Booting involves starting the computer system, for example, by turning on the power to it. In response to the application of power, the processors in the system execute preliminary instructions at a pre-designated address in an attempt to initialize the processors and place them in an operational mode so that they may execute programs or applications. If any of these processors fails during the booting, the entire system may deadlock and be unable to operate. Booting may also involve a warm reset, which involves a software or hardware reset of a processor already running or to which power is already applied.

One of the processors in a multi-processor system is typically pre-designated as a boot strap processor. The boot strap processor functions to initialize the other processors during the booting process. If the boot strap processor fails during booting, the entire system may again deadlock and be unable to operate.

Accordingly, a need exists for an improved apparatus and method for fault resilient booting of a multi-processor system.

SUMMARY OF THE INVENTION

A first method consistent with the present invention may be used to boot a computer system having a plurality of processors. The method includes performing a cold reset of the processors and determining if any of the processors failed during the cold reset. The method also includes performing a warm reset of the processors and isolating any of the processors that failed in conjunction with performing the warm reset.

A first apparatus consistent with the present invention boots a computer system having a plurality of processors. The apparatus performs a cold reset of the processors and determines if any of the processors failed during the cold reset. The apparatus also performs a warm reset of the processors and isolates any of the processors that failed in conjunction with performing the warm reset.

A second method consistent with the present invention includes performing a cold reset of a plurality of processors within each of node of a multi-processor system. The cold reset involves attempting to identify one of the processors in each of the plurality of processors as a node-boot strap processor. The method further includes attempting to identify one of the node-boot strap processors as a system boot-strap processor and using the system-boot strap processor to perform a warm reset of the plurality of processors in each of the nodes. In conjunction with performing the warm reset, any of the processors that failed are isolated.

A second apparatus consistent with the present invention performs a cold reset of a plurality of processors within each of node of a multi-processor system. In conjunction with performing the cold reset, the apparatus attempts to identify one of the processors in each of the plurality processors as a node-boot strap processor. The apparatus also attempts to identify one of the node-boot strap processors as a system boot-strap processor and uses the system-boot strap processor to perform a warm reset of the plurality of processors in each of the nodes. In conjunction with performing the warm reset, the apparatus isolates any of the processors that failed.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

An embodiment consistent with the present invention performs fault resilient booting in a multi-processor system. It performs a cold reset, which involves initializing processors for operation by applying power to them. During the cold reset the processors attempt to perform a built-in self test (BIST). BISTs are known in the art and typically predefined for each particular type of processor. The system detects any failed processor due to a failure of the BIST or a failure to respond. The system then performs a warm reset, which involves initializing the processors for operation while power is already applied to them. During the warm reset, the system isolates any failed processor. Isolating refers to effectively electrically disconnect a processor from the system and may be accomplished with, for example, tristating. Also, a boot strap processor is used within the system to initialize the other processors. If the boot strap processor fails, the system detects the failure and, during a warm reset, tristates the processor pre-designed as the boot strap processor on each node and again attempts to designate a boot strap processor, repeating the process.

Figure 1:
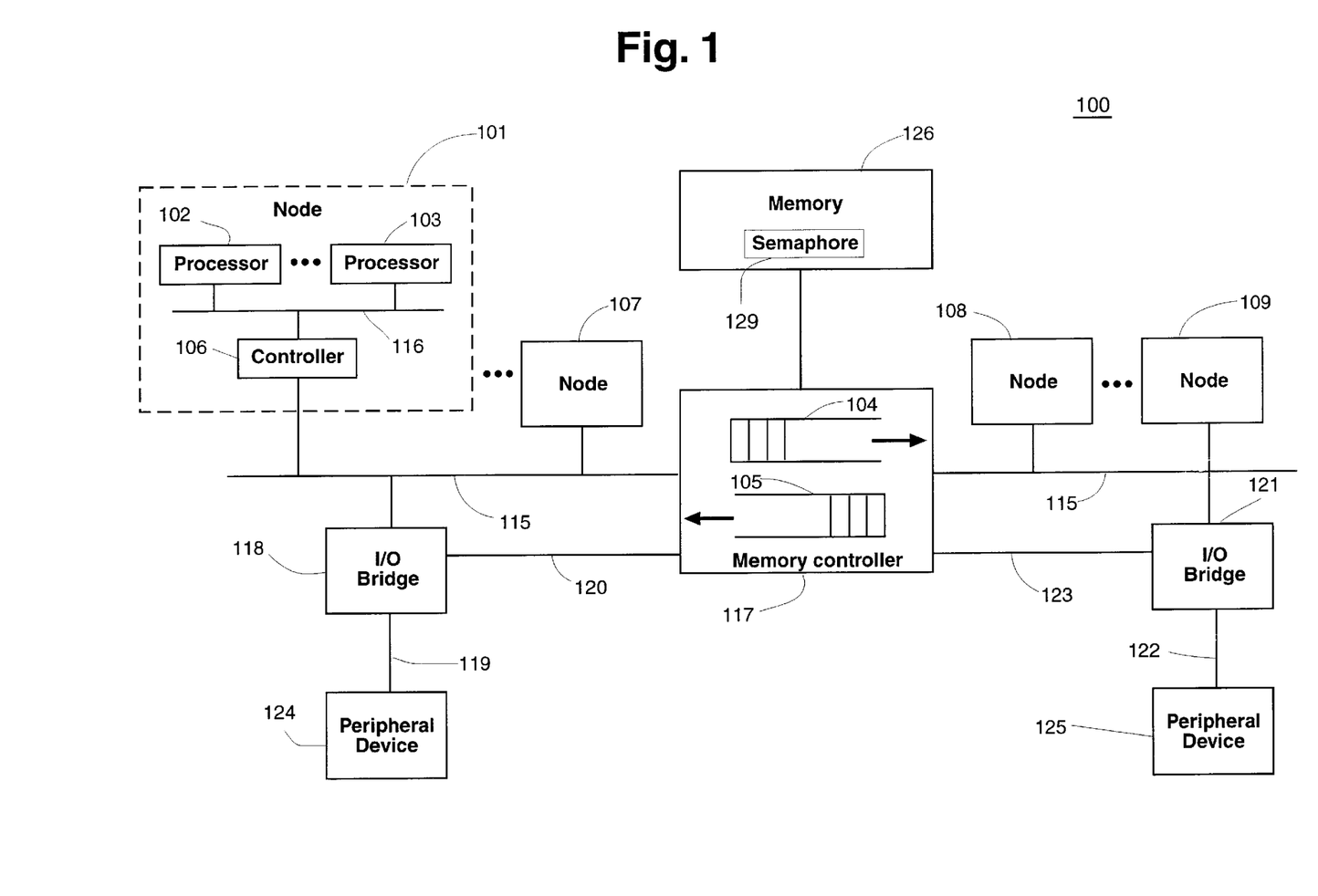
FIG. 1 is a block diagram of an exemplary multi-processor system for implementing fault resilient booting.

FIG. 1 is a block diagram of an exemplary computer system 100 having a mixed architecture and including components for implementing fault resilient booting in the system. In system 100, a plurality of nodes 101 and 107–109 each typically include a plurality of processors. As shown for example in node 101, one or more processors 102 and 103 are coupled along a bus 116 to a controller 106. Controller 106 includes terminals for electrical connection with bus 116 and a bus 115, and controller 106 interfaces processors 102 and 103 on bus 116 with bus 115.

The mixed architecture may be implemented such that processors having a reduced byte length are connected to and operate with a higher capacity bus for use with improved performance of memory and peripherals. Processors 102 and 103 may be implemented with any type of processor, such as a product within the Pentium® Pro line of processors, also referred to as the P6 processor, by Intel Corp. Bus 116 may be implemented with any capacity and type of bus interfacing processors 102 and 103 with a controller, such as the 64-bit P6 bus. Likewise, bus 115 may be implemented with any capacity and type of bus interfacing a controller with a memory or an input/output (I/O) bridge, such as a bus within the Merced architecture.

Bus 115 connects with a memory controller 117, which may be implemented with any device for controlling reading to and writing from a memory, such as any type of synchronous dynamic random access memory (DRAM) 126. Memory 126 may include a semaphore 129, used for identifying a system-boot strap processor (system-BSP) and typically implemented using an addressable location in memory 126. Semaphore 129 may be implemented in other ways, such as by using memory mapped I/O or I/O ports. Memory controller 117 includes forwarding queues 104 and 105 for buffering transactions between buses 115. A system-BSP is a processor used to control resetting of other processors in system 100.

Additional components may be connected to bus 115, but are not necessarily required or used for fault resilient booting. For example, also connected with bus 115 may be an I/O bridge 118 and another I/O bridge 121. I/O bridge 118 may be coupled to a peripheral device 124, and it interfaces peripheral device 124 with bus 115 via connection 119. Likewise, I/O bridge 121 may interface peripheral device 125 with bus 115 via connection 122. Lines 120 and 123 provide for arbitration control between I/O bridges 118 and 121 and memory controller 117, if necessary, and such arbitration techniques are known in the art. Each I/O bridge 118 and 121 may be implemented with any device for interfacing a peripheral device with a computer bus and such controllers are known in the art. Each peripheral device 124 and 125 may be implemented with any type of computer peripheral such as a keyboard, cursor control device, input device, or output device. System 100 may also include local clocks, as necessary, for controlling the components of the system.

Each of the additional nodes 107–109 are also coupled with bus 115, and each of these nodes typically includes a similar controller coupled with a plurality of processors, as shown in node 101. The other nodes 107–109 also typically include a similar bus 116 for coupling their processors to a controller. Accordingly, each of the nodes 101 and 107–109 interface processors on a first type of bus with a second type of bus.

Figure 2:
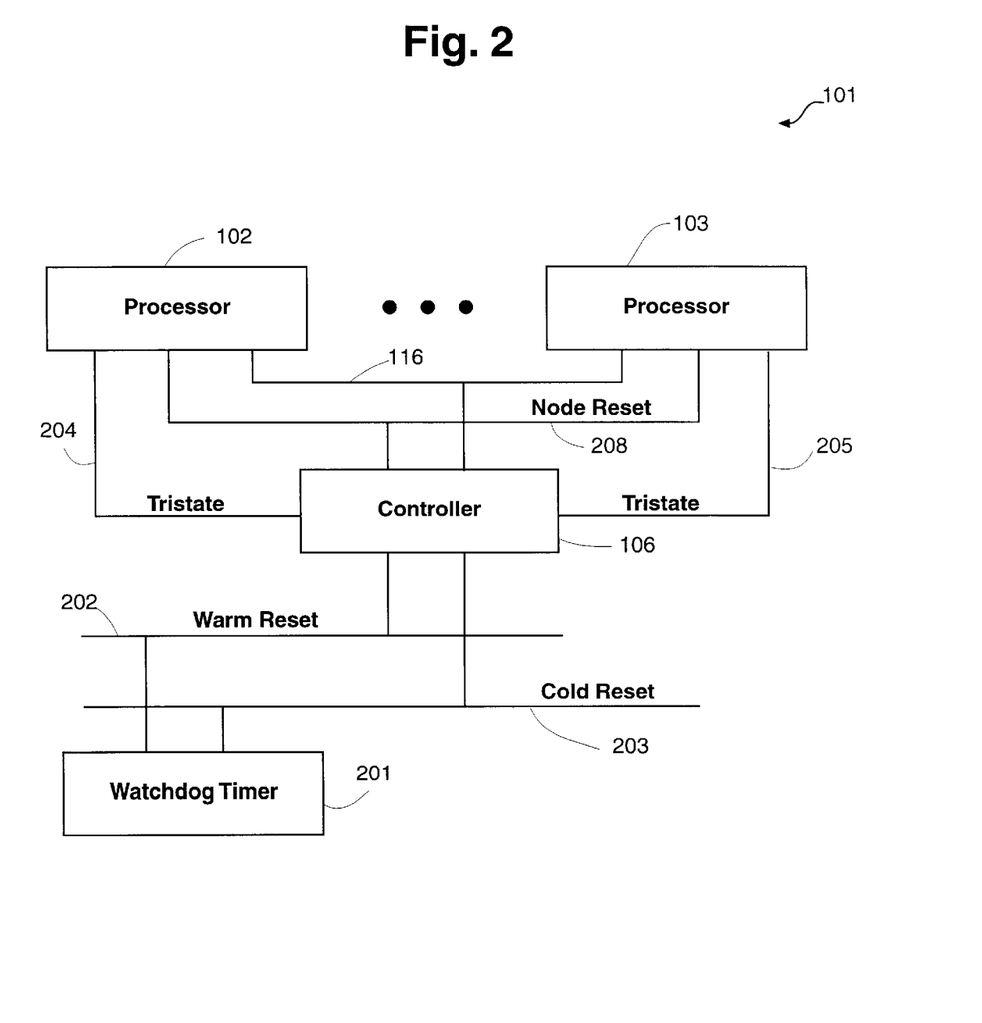
FIG. 2 is a block diagram of one node in a multi-processor system illustrating control lines for performing fault resilient booting in the system.

FIG. 2 is a block diagram of node 101 in the system of FIG. 1 illustrating control lines for performing fault resilient booting. The other nodes 107–109 typically include similar functions. Controller 106 is coupled via node reset line 208 to one or more processors 102–103, and it uses node reset line 208 to reset each of the corresponding processors. Controller 106 is also coupled via tristate lines 204–205 to processors 102–103, respectively. A signal is used on these lines to cause a processor to be tristated during the booting process. For example, the Intel P6 processors use the FLUSH# signal for this purpose. In addition, controller 106 is coupled via a warm reset line 202 and a cold reset line 203 to a watchdog timer 201. Cold reset line 203 is used to perform a cold reset of the processors in each node, and warm reset line 202 is used to perform a warm reset of the processors in each node. Watchdog timer 201 is used to generate a time-out signal.

Figure 3A:
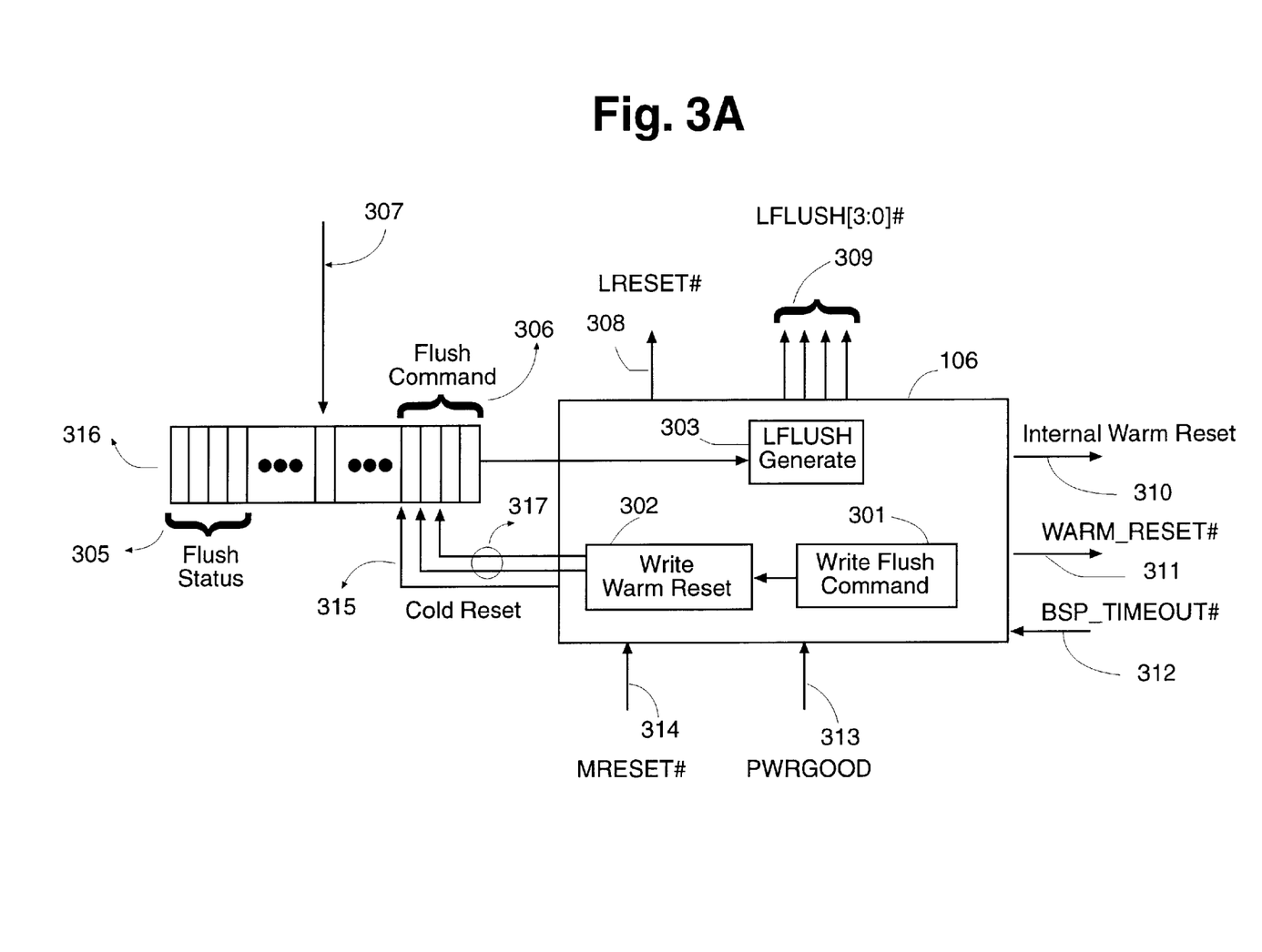
FIG. 3A is a block diagram of resources used by a controller for a reset command in a multi-processor system.
Figure 3B:
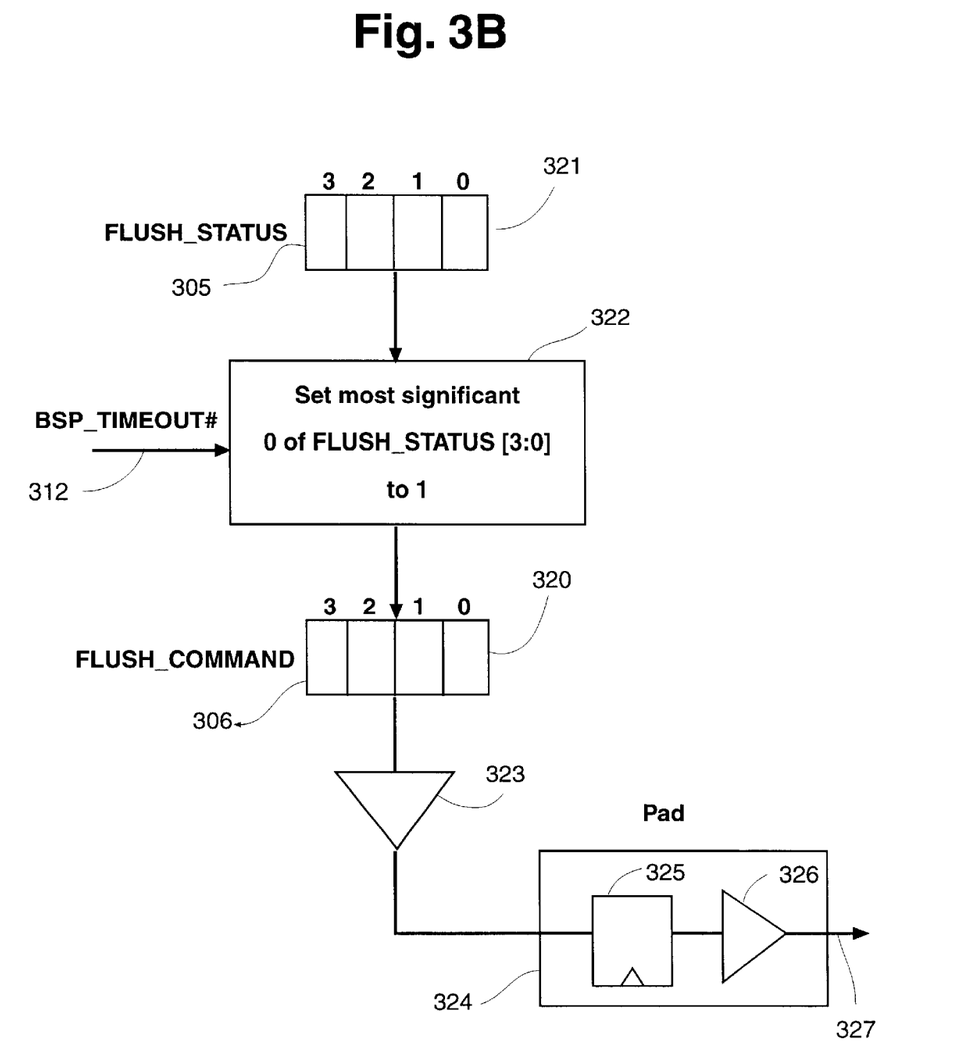
FIG. 3B is a block diagram of resources used by a controller for flush bit control at time-out during booting of a multi-processor system.
Figure 3C:
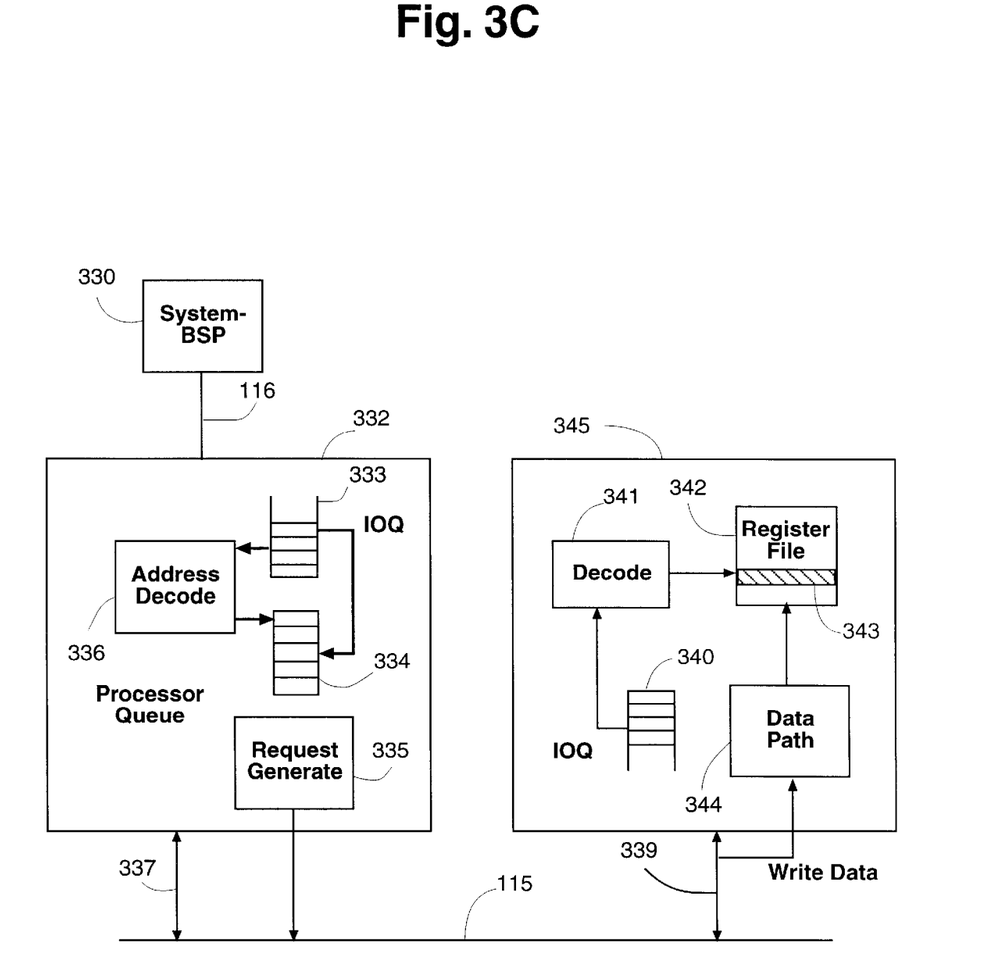
FIG. 3C is a block diagram of resources used by a controller for a system-boot strap processor during booting of a multi-processor system.

FIGS. 3A–3C are block diagrams showing modules or elements for implementing hardware functions in controller 106, and the controllers in the other nodes 107–109, for booting system 100. Although an embodiment is shown using hardware components, the booting may alternatively be accomplished using modules including a processor operating under control of software or firmware, or a combination of software processing and specialized hardware components. The hardware modules shown in FIGS. 3A–3C are implemented, for example, using logic gates to perform the functions described below or equivalent functions. The sequence of the modules performing the functions is typically implemented using clock signals from local bus clocks that drive components connected to buses 115 and 116, respectively. The term module is intended to include use of one or more modules.

In general, the booting involves performing a cold reset and selecting a node-boot strap processor (node-BSP), selecting a system-BSP, and isolating failed processors. A node-BSP is a processor in each node 101 and 107–109 used to attempt to define a system-BSP. First, a cold reset of system 100 is performed using the modules shown in FIG. 3A. In conjunction with the cold reset, each processor performs a BIST and each node selects one of the processors to be the node-BSP. Second, each node-BSP then attempts to obtain semaphore 129 in order to become the system-BSP. If none obtains semaphore 129 within a particular time period, as determined by time-out of watchdog timer 201, the controllers in each node, using the modules shown in FIG. 3B, progressively tristate processors in their nodes and repeat the process of attempting to identify a system-BSP. Third, once a node-BSP obtains semaphore 129 and becomes the system-BSP, it sends a signal to each controller to ignore the signal from watchdog timer 201, and the system-BSP, using the modules shown in FIG. 3C, checks the status of each processor and provides instructions to tristate those that failed.

As shown more particularly in FIG. 3A for executing a cold reset, controller 106 includes a write warm reset command 302 and write flush command 301, which performs decoding and formatting of a flush command 306 in a command and status register 316. Controller 106 also includes an LFLUSH generate 303 for generating an LFLUSH signal 309 for transmission on tristate lines 204–205. The example shown in FIG. 3B includes a four-bit flush command for use with a four-processor node and thus would require two more tristate lines in addition to lines 204–205.

Controller 106 also may generate a warm reset signal to perform a warm reset of itself and the other controllers in the system, and also may generate an LRESET signal 308 in order to execute a warm reset on bus 116. Controller 106 may receive a power good signal (PWRGOOD) 313 and a master reset (MRESET) signal 314, both of which relate to distinguishing a cold from a warm reset. In particular, controller 106 performs a cold reset in response to a combination of MRESET signal 314 being asserted and PWRGOOD signal 313 being de-asserted. Controller 106 also may receive a BSP_time-out signal 312, which is used to perform a warm reset following time-out of watchdog timer 201.

Command and status register 316, contained in controller 106, includes signals and information for use in the fault resilient booting. A flush status 305 indicates the previous value of the flush command, indicating previously tristated processor(s). A flush command 306, issued on lines 204–205 as flush signal 309, indicates which processor in system 100 is to be tristated. Tristating is a known technique for effectively electrically disconnecting a processor from a multiprocessor system. An enable warm reset bit 307 performs a software controlled reset.

A cold reset signal 315, issued on line 203, provides information concerning a cold reset, and lines 317 provide information to write flush command 306 from write warm reset 302 to command and status register 306. LFLUSH generate 303 functions to turn the flush command bits into a signal for tristate lines 309, latches the signal onto lines 309, and performs necessary timing protocol. Internal warm reset signal 310 is typically a buffered version of warm reset signal 311 issued on line 202.

FIG. 3B shows hardware modules used by controller 106, for example, for flush bit control. The other controllers in nodes 107–109 contain similar circuitry. This circuitry is used by controller 106 to sequence through processors 102–103 in node 101 of system 100 and, upon receiving a time-out signal, sequentially tristate processors until a system-BSP is identified. Flush status 305 includes four bits 321 identifying the previous flush command. Bits 321 are coupled to module 322, which functions to set the most significant zero-valued bit of the flush status signal to the value "one" in order to tristate the corresponding processor. Module 322 is also coupled to register 320 containing flush command 306, which is latched onto the tristate lines. Buffer 323 provides buffering of the flush command to a pad 324 within the controller. Within pad 324, a latch 325 and buffer 326 provide latching and transmission of the flush command onto tristate lines 327 transmitting the LFLUSH signal off chip to the processors.

The flush command uses one bit per processor; this example illustrating use of a four-bit flush command for a system having four processors per node. BSP time-out signal is provided from a time-out flag 312. Upon receiving the first BSP time-out signal, controller 106 sets the most significant bit of the flush command and issues it to tristate the processor corresponding to that bit. As controller 106 continues to receive BSP time-out signals after successive warm reset and tristating sequences, it continues sequentially setting more bits from most significant to least significant, and one set for each BSP time-out signal, until a system-BSP is identified and issues a signal to ignore the BSP time-out signal. Therefore, controller 106 progressively tristates processors in its node until a system-BSP is identified. If all processors become tristated, an embedded controller resets the entire system in a manner that does not tristate any processors, meaning that a forced cold start is executed.

FIG. 3C shows hardware modules used by the controllers in system 100 in order decode and execute commands from a system-BSP. A system-BSP 330 uses the hardware elements within the controllers, such as controllers 345 and 332, to write from one controller to another in order to perform the booting process. System-BSP 330 communicates with controller 332 via a bus 116. Within controller 336, an input output queue (IOQ) 333 receives information from a command and status register transmitted by system-BSP 330. Address decoder 332 performs decoding of the signal in order to determine if controller 332 is the intended destination of the signal from the command and status register. Processor queue 334 receives the decoded information and transfers it to request generate 335, which transmits the information via connection 337 onto bus 115.

Controller 345 receives the information from bus 115 via a connection 339. IOQ 340 receives and stores the information for the address, and the corresponding write data is transmitted through a data path 344. Decode element 341 receives the information from IOQ 340 and determines if controller 345 is the intended destination of the information. In particular, it decodes the address during one timing phase and, if it determines controller 345 is the intended destination, it subsequently latches data from data path 344 into register file 342 during a write timing phase. Register file 342 stores the information in command and status register 343.

Once system-BSP 330 is identified, it issues a signal to each controller to ignore the BSP time-out signal so that the controllers do not tristate additional processors in their nodes beyond those already tristated, as explained with respect to FIG. 3B. Operating under software or firmware control, system-BSP 330 checks that the status of each processor by evaluating results of the BIST for each processor. For any processor that failed, system-BSP 330 tristates the processor using a signal command and warm reset.

System-BSP 330 addresses each processor by issuing commands with particular addresses. Each controller in system 100 includes a hard-wired range of address space. Upon receiving a command with a particular address sourced by system-BSP 330 via controller 332, each controller decodes the command by comparing the particular address with the range of address space for the controller. If the particular address is within its range of address space, the controller executes the command. Therefore, system-BSP 330 may tristate individual processors by issuing a signal command and warm reset command with an address within the address space of a controller for the individual processors. In response, that controller issues the flush command and performs a warm reset for the processors in its node, and upon executing the warm reset the failed processor tristates in response to the flush command.

Figure 4:
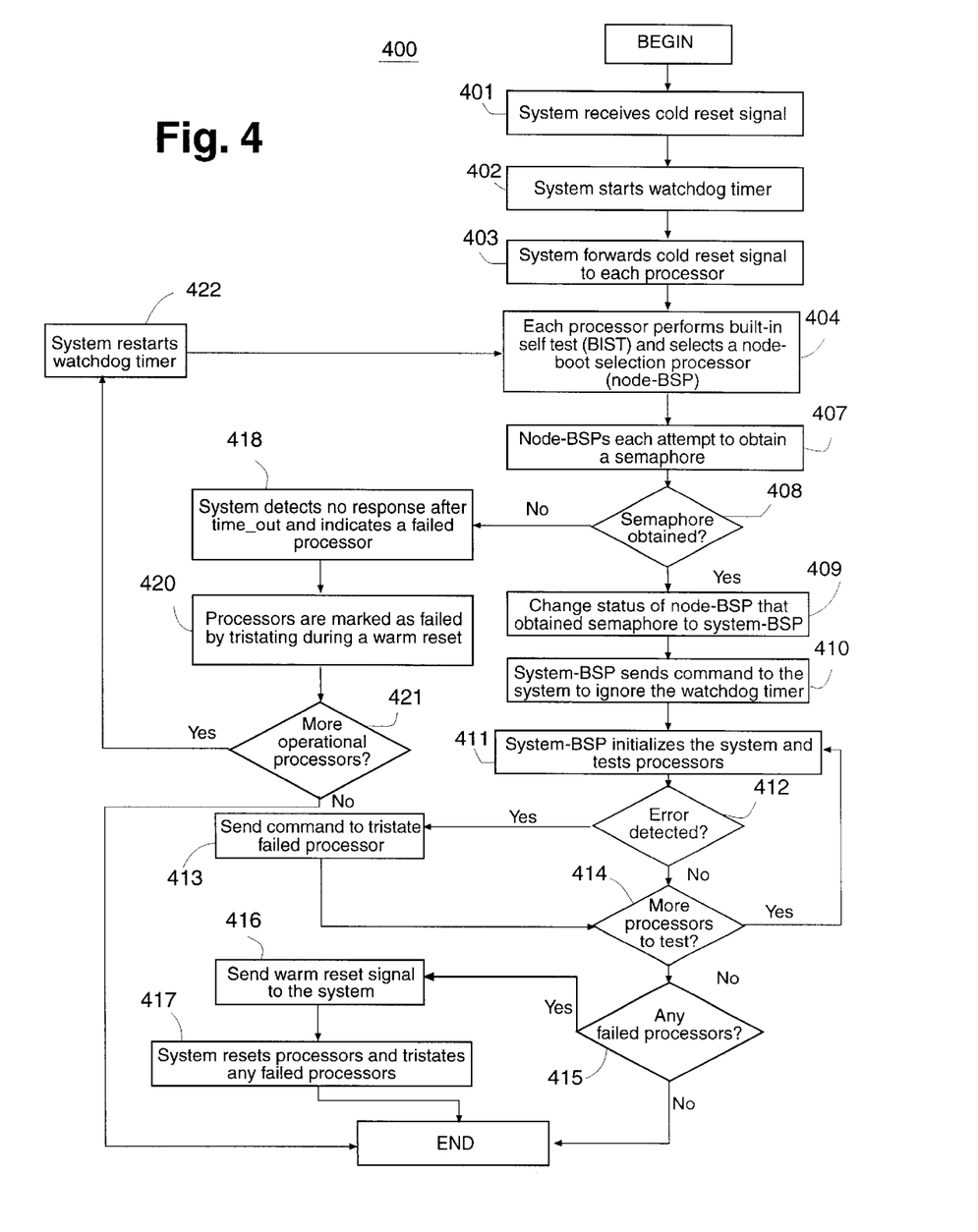
FIG. 4 is a flow chart of a process for performing fault resilient booting in a multi-processor system.

FIG. 4 is a flow chart of a process 400 for performing fault resilient booting in system 100. The controllers, such as controller 106, as explained above with respect to FIGS. 3A–3C typically implement these functions using hardware modules. However, it may also alternatively implement these functions in software or firmware controlling the operation of a processor in the controller. In process 400, a system controls the booting process; the "system" refers to, for example, controller 106 using the same or equivalent hardware functions shown in FIGS. 3A–3C, or use software or firmware controlling a processor.

The system receives a cold reset signal (step 401) and, in response, it starts watchdog timer 201 (step 402). The system forwards the cold reset signal via line 208 to each of the processors 102–103 using, for example, the modules shown in FIG. 3A (step 403). In response, each of the processors 102–103 performs a BIST and selects one of them as the node-BSP (step 404). The controllers for the other nodes 107–109 also receive the cold reset signal and forward it to the processors in their respective nodes, and those processors in response also perform a BIST and select a node-BSP.

The designation of a node-BSP is typically predetermined according to an identification (ID) number for each processor, and processors 102–103 therefore select one of them as the node-BSP by a comparison of their ID numbers, using, for example, the processor with the highest ID as the node-BSP. If any of the processors failed, a node-BSP is selected among the remaining processors using a similar comparison, such as selecting the processor with the highest APIC ID among the remaining Intel P6 processors. Various other protocols may exist for selecting a node-BSP among a plurality of processors. Such protocols are known with respect to, for example, the P6 processor.

The node-BSPs from each node attempt to obtain semaphore 129 in order to select one of them to be the system-BSP (step 407). The first node-BSP to obtain semaphore 129 is designated as the system-BSP. Since system 100 may include different clock signals for controlling its components, the node-BSPs do not necessarily all attempt to obtain semaphore 129 in synchronicity, and the system-BSP is thus not necessarily predetermined.

The system determines if one of the node-BSPs obtained semaphore 129 (step 408), as determined by inter-node transactions that communicate that the watchdog timer 201 time-out should be ignored. As described above, when one of the node-BSPs obtains semaphore 129, it sends a signal to the other controllers instructing them to ignore the BSP time-out signal generated upon time-out of watchdog timer 201. Therefore, upon receipt of the BSP time-out signal, the system knows that none of the node-BSPs obtained semaphore 129 and no system-BSP exists.

The system then again attempts to identify a system-BSP. In particular, the system indicates the failed processor in the command and status register (step 418) and tristates the failed processor during a warm reset (step 420), using, for example, the modules shown in FIG. 3B. The system determines if it includes more operational processors (step 421), which may involve determining if through repeated tristating in step 418 the system has tristated all processors. If not, the system restarts watchdog timer 201 (step 422) and returns to step 404 in order to attempt to again identify a system-BSP. If no more operational processors exist as determined in step 421, the system is incapable of booting, as it must have at least one operational processor to boot and function. Each node 101 and 107–109 in system 100 can be heterogeneous and may have a different number of processors. Controller 106 has the capability to tristate bus 116 causing an entire node to be isolated. This may be used to isolate bus 116 failures or processor failures that could not be isolated by having the hardware tristate itself.

If a semaphore 129 is obtained, as determined in step 408, the node-BSP obtaining semaphore 129 becomes the system-BSP and it changes its status to system-BSP for control of all processors for the remainder of the booting process (step 409). The system-BSP sends a command to each controller in the system to ignore watchdog timer 201 (step 410); otherwise, a time-out of watchdog timer 201 would unnecessarily cause tristating of additional good processors.

The system-BSP initializes each processor in the system and tests the processors to determine if any failed (step 411). The system-BSP detects failed processors due to a failed BIST or failure of a processor to respond within a particular time period as determined, for example, by a time-out of watchdog timer 201 (step 412). If any processor failed, the system-BSP sends a command to a controller in the node for the processor instructing it to tristate the failed processor using, for example, the modules shown in FIG. 3C (step 413).

The system-BSP determines if more processors exist to test (step 414) and, if so, it repeats steps 412 and 413. Otherwise, it determines if any processors had failed (step 415) and, if so, it sends a warm reset signal to the processors through the corresponding controllers (step 416). In response, the controllers reset their corresponding processors, during which they tristate any failed processors. The system-BSP may alternatively individually issue a warm reset along with the flush command to reset and tristate failed processors one at a time. The system-BSP may operate under software or firmware control in order to implement steps 409–417 and may use, for example, the modules shown in FIG. 3C to individually address controllers for particular processors to execute these steps.

While the present invention has been described in connection with an exemplary embodiment, it will be understood that many modifications will be readily apparent to those skilled in the art, and this application is intended to cover any adaptations or variations thereof. For example, different numbers of processors per node, numbers of nodes, capacities of the buses, types of processors, types of buses, and labels for the various entities and buses may be used without departing from the scope of the invention. This invention should be limited only by the claims and equivalents thereof.

What is claimed is:

1. A method of booting a computer system having a plurality of processors, comprising:
   performing a cold reset of the processors;
   determining if any of the processors failed during the cold reset;
   performing a warm reset of the processors; and
   electrically isolating any of the processors that failed in conjunction with performing the warm reset,
   wherein the performing a cold reset step includes transmitting a signal to each of the processors prompting the processors to perform a self-test, and
   wherein the determining step includes detecting a failure of any of the processors to respond to the signal within a particular time period.

2. The method of claim 1 wherein the isolating step includes tristating the failed processors.

3. The method of claim 1 wherein the performing a cold reset step includes transmitting a signal to each of the processors prompting the processors to perform a self-test.

4. The method of claim 1, further including identifying one of the processors as a boot strap processor.

5. The method of claim 4, further including using the boot strap processor to control resetting of other processors in the system.

6. A method of booting a computer system having a plurality of processors, comprising:
   performing a cold reset of the processors;
   determining if any of the processors failed during the cold reset;
   performing a warm reset of the processors; and
   electrically isolating any of the processors that failed in conjunction with performing the warm reset, the method further including:
   receiving a command relating to the booting; and
   decoding the command to determine whether to execute the command.

7. A method of booting a computer system having a plurality of nodes, each of the plurality of nodes being associated with a plurality of processors, comprising:
   performing a cold reset of the plurality of processors within each of the nodes, including attempting to identify one of the processors in each of the plurality of processors as a node-boot strap processor;

attempting to identify one of the node-boot strap processors as a system boot-strap processor;

using the system-boot strap processor to perform a warm reset of the plurality of processors in each of the nodes; and electrically isolating any of the processors that failed in conjunction with performing the warm reset, the method further including:

determining if none of the node-boot strap processors were identified as the system-boot strap processor;

identifying, based upon the determining, which processor among the plurality of processors in each of the nodes was designated to be the node-boot strap processor; and identifying the designated processors as having failed.

8. The method of claim 7 wherein the determining step includes determining whether none of the plurality of processors in each of the nodes responded to the cold reset within a particular time period.

9. An apparatus for booting a computer system having a plurality of processors, comprising:

a module that performs a cold reset of the processors;

a module that determines if any of the processors failed during the cold reset;

a module that performs a warm reset of the processors; and a module that electrically isolates any of the processors that failed in conjunction with performing the warm reset, wherein the performing a cold reset module includes a module that transmits a signal to each of the processors prompting the processors to perform a self-test, and wherein the determining module includes a module that detects a failure of any of the processors to respond to the signal within a particular time period.

10. The apparatus of claim 9 wherein the isolating module includes a module that tristates the failed processors.

11. The apparatus of claim 9, further including a module that identifies one of the processors as a boot strap processor.

12. The apparatus of claim 11, further including a module that uses the boot strap processor to control resetting of other processors in the system.

13. The apparatus of claim 9, further including:

a memory; and a memory controller, coupling between the second bus and the memory, for use in forwarding data to and from the memory.

14. An apparatus for booting a computer system having a plurality of processors, comprising:

a module that performs a cold reset of the processors;

a module that determines if any of the processors failed during the cold reset;

a module that performs a warm reset of the processors; and a module that electrically isolates any of the processors that failed in conjunction with performing the warm reset, the apparatus further including:

a module that receives a command relating to the booting; and a module that decodes the command to determine whether to execute the command.

15. An apparatus for booting a computer system having a plurality of nodes, each of the plurality of nodes being associated with a plurality of processors, comprising:

a module that performs a cold reset of the plurality of processors within each of the nodes, including a module that attempts to identify one of the processors in each of the plurality of processors as a node-boot strap processor;

a module that attempts to identify one of the node-boot strap processors as a system boot-strap processor;

a module that uses the system-boot strap processor to perform a warm reset of the plurality of processors in each of the nodes; and a module that electrically isolates any of the processors that failed in conjunction with performing the warm reset, the apparatus further including:

a module that determines if none of the node-boot strap processors were identified as the system-boot strap processor;

a module that identifies, based upon the determining, which processor among the plurality of processors in each of the nodes was designated to be the node-boot strap processor; and a module that identifies the designated processors as having failed.

16. The apparatus of claim 15 wherein the determining module includes a module that determines whether none of the plurality of processors in each of the nodes responded to the cold reset within a particular time period.

* * * * *